Jan. 9, 1951     P. E. ALLEN     2,537,567
PROTECTIVE SHIELD FOR GASOLINE FILLER
OPENINGS IN AUTOMOBILE FENDERS
Filed April 9, 1949     2 Sheets-Sheet 1
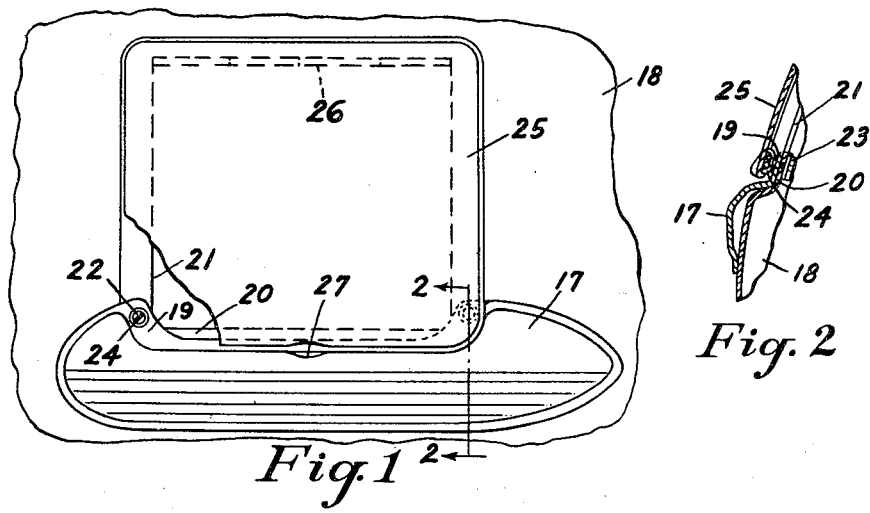
Fig. 1
Fig. 2
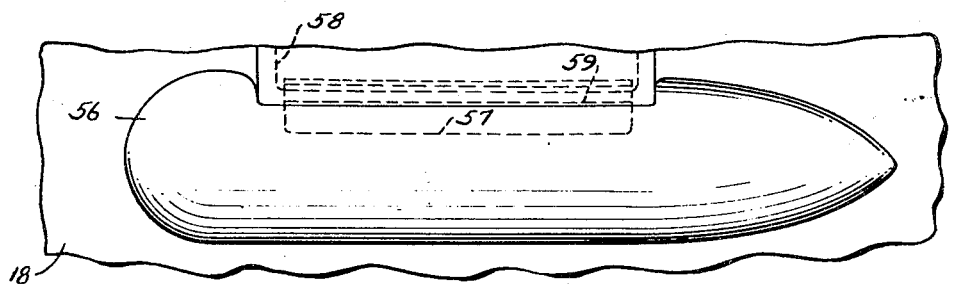
Fig. 3
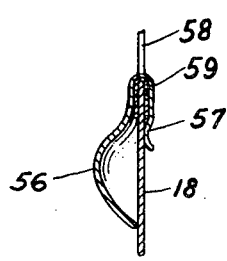
Fig. 5
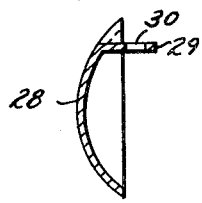
Fig. 4
INVENTOR.
PERRY E. ALLEN
BY Edward M. Apple
ATTORNEY Jan. 9, 1951　　　　　P. E. ALLEN　　　　　2,537,567
PROTECTIVE SHIELD FOR GASOLINE FILLER
OPENINGS IN AUTOMOBILE FENDERS
Filed April 9, 1949　　　　　　　　　　2 Sheets-Sheet 2

INVENTOR.
PERRY E. ALLEN

BY Edward M. Apple
ATTORNEY

Patented Jan. 9, 1951

2,537,567

UNITED STATES PATENT OFFICE 2,537,567

PROTECTIVE SHIELD FOR GASOLINE FILLER OPENINGS IN AUTOMOBILE FENDERS

Perry E. Allen, Detroit, Mich.

Application April 9, 1949, Serial No. 86,484

7 Claims. (Cl. 280—153)

This invention relates to automotive vehicles and accessories for the same, such as disclosed in my co-pending application, S. N. 759,141, which issued into Patent Number 2,467,001, of which this application may be considered a continuation in part.

An object of the invention is to provide a protective shield or guard for the automobile fender adjacent to the opening in the fender which provides access to the gasoline tank filler pipe, whereby the finish on the fender is protected against damage by a gasoline station attendant in inserting the gasoline hose nozzle in a fender opening, during a filling operation.

Another object of the invention is to provide a perfect contact when the device is made entirely of metal for grounding any static electricity which may be stored in the gasoline filler hose and nozzle at the time of starting the filling operation.

Another object of the invention is to provide novel means for attaching such an accessory to a conventional automobile fender.

Another object of the invention is the provision of a protective shield for an automobile fender adjacent the gasoline filler opening in the fender, with a frame like element secured thereto, which said frame like element is arranged to align with a substantial part of the fender opening and serves as additional means for attaching the device to the automobile fender and means for supporting the hinged cover plate for said fender opening.

Other objects and advantages of the invention will become more apparent as the description proceeds, reference being made from time to time to the accompanying drawings forming part of the within disclosure in which drawings:

Fig. 1 is a plan view of a device embodying the invention in position on an automobile fender adjacent the gasoline filler opening in the fender.

Fig. 2 is a section taken substantially on the line 2—2 of Fig. 1.

Fig. 3 is a plan view of the embodiment shown in Fig. 5.

Fig. 4 is a section taken on the line 4—4 of Fig. 6.

Fig. 5 is a sectional view of another form of the device.

Figure 6:
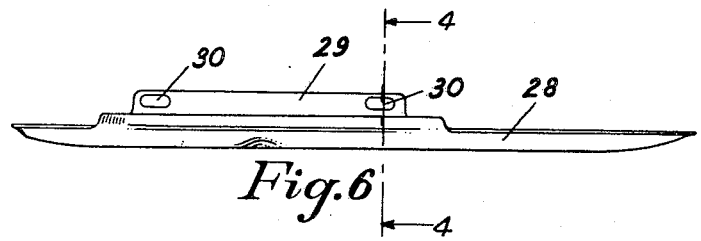
Fig. 6 is a top plan view of a modified form of the device embodying the invention.

Referring now more particularly to the drawings, it will be understood that in the embodiment herein disclosed in Figs. 1 and 2, the reference character 17 indicates the protective shield or member, which in this embodiment is made entirely of metal which is preferably plated and highly polished, and of such configuration and contour as to present a pleasing appearance to the eye, and add a decorative note to the trim on the automobile. This form of device has various functional attributes also. Because of its all metal construction and because of its secure and direct attachment to the metal comprising the fender, as hereinafter described, it provides a perfect ground for any static electricity which might be stored in the gasoline hose and nozzle of the service station gasoline pump, thereby providing one safety factor to the otherwise hazardous operation of filling the automobile gasoline tank.

Further, because of the crowned or convex formation of the protective shield, as illustrated in the embodiments disclosed in Figs. 1, 2 and 5 through 10, inclusive, its upper surface extends well above the surface of the fender and thereby affords physical protection to the fender 18.

In Figs. 1 and 2 the protective member 17 is formed with a flat depressed web portion 19 which is adapted to closely contact the flange 20 formed as an integral part of the fender 18 along the opening 21 formed in the fender.

The web 19 is securely attached to the fender flange 20 by means of metal screws 22 and "Speed Nuts" 23 (Fig. 2). Cup-shaped rubber bumpers 24 are preferably carried on the screws 22 to protect the gasoline filler door 25, which is hinged as at 26, from the metal screws 22 and serve to deaden the sound of otherwise metal to metal contact between the parts. The protective shield 17 may be provided with a small depression 27 to provide clearance for inserting a finger to facilitate the lifting of the door 25.

Figure 7:
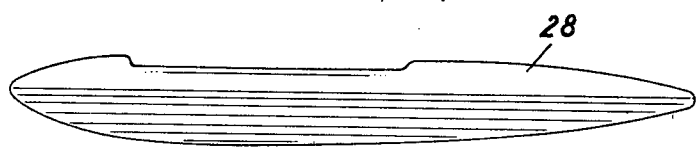
Fig. 7 is a side elevational view of the device shown in Fig. 6.
Figure 8:
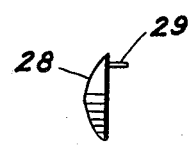
Fig. 8 is an end view of the device shown in Fig. 6.

In Figs. 6, 7, and 8, the protective shield 28 is provided with an inturned member 29 which is slotted as at 30 to accommodate metal screws or other means for attaching the device to a suitable flange formed on the automobile fender. It will be noted that in Figs. 1 and 2, the member 19 lies in a plane substantially parallel with the longitudinal axis of the shield 17, whereas in Figs. 6 to 8, the member 29 lies in a plane substantially at right angles to the longitudinal axis of the protective shield 28.

Such modifications are necessary to accommodate the different types of integral flanges formed on the fenders of different makes of automobiles.

In Figs. 3 and 5, I illustrate the manner in which a crowned type of shield 56 may have its inner edge inturned to form a spring clip 57, which is adapted to extend through the opening 58 in the fender 18 and frictionally engage the back of the fender to hold the shield in position. In such an application a rubber or felt gasket 59 may be used around the opening 58 to insulate the element against vibration.

Figure 9:
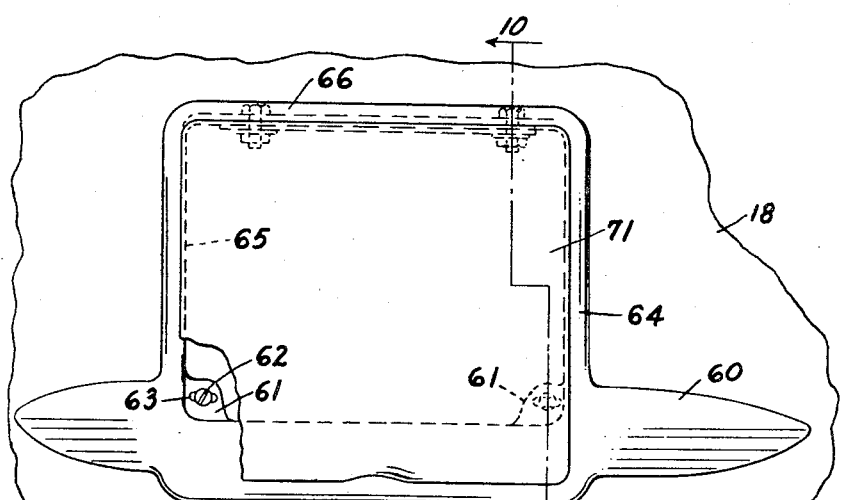
Fig. 9 is a plan view of another modified form of device embodying the invention.
Figure 10:
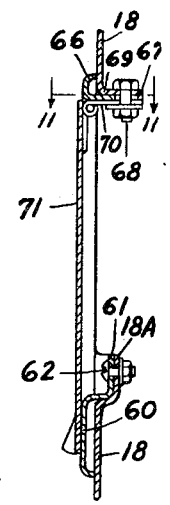
Fig. 10 is a section taken substantially on the line 10—10 of Fig. 9.
Figure 11:
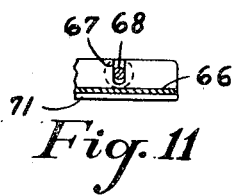
Fig. 11 is a section taken substantially on the line 11—11 of Fig. 10.

In Figs. 9 and 10, I show a still further modified form of the invention. In this embodiment the protective shield 60 is of the crowned type and is provided with the depressed web-like elements 61, which are secured to corresponding flanges 18—A (Fig. 10) formed on the fender 18 by means of screws 62 as previously described. In this embodiment the webs 61 are slotted, as at 63, so that various degrees of lateral adjustment may be made. In this embodiment the protective shield 60 is formed with an integral frame-like member 64 which may extend along and align with the edge of the cutout 65 formed in the fender. The frame 64 may be continuous, or may be split at the back 66 near the center. In either event the back section 66 of the frame is slotted as at 67 (Fig. 10) so that the slots may engage the bolts 68 which extend through the fender flange 69 to secure the hinge 70 of the cover 71 in position. It is also within the contemplation of the invention to secure the hinged member 70 directly to the frame 66 by means of welding or the like, so that the protective shield 60, the frame 64 and the cover 71 might be sold as one assembly.

Having described my invention what I claim and desire to secure by Letters Patent is:

1. An article of manufacture of the character described, comprising a protective member having a section adapted to align with a cutout portion of an automobile fender, there being at least one element formed on said member adapted to cooperate with a corresponding element formed on said fender for securing said member to said fender, said member having a crowned body portion positioned outwardly of the marginal limits of said cutout portion.

2. The combination with an automobile fender having an opening for admitting fuel, of a protective member having a cutout portion adapted to align with said opening, and having an element adapted to contact an element formed on said fender along said opening, and having a crowned body portion of greater length than the width of said fender opening, and means for attaching said element to said fender.

3. An article of manufacture adapted to serve as a protective element and a static ground for an automobile fender adjacent a gasoline filler opening in said fender, comprising an elongated metallic member having a cutout portion adapted to align with the cutout portion of said fender, and having a contour arranged to permit it to closely contact said fender along said opening, and having a crowned central portion spaced from the surface of said fender adjacent said fender opening.

4. The combination defined in claim 3, including means for attaching said protective element to said fender.

5. The combination with an automobile fender having an opening for admitting fuel, of an elongated protective member having a portion arranged to align with said opening in said fender, and having one or more inturned elements arranged to co-act with corresponding elements formed on said fender along said opening, said first named elements being slotted to accommodate fastening means, means in said slots adapted to cooperate with openings in the elements formed on said fender for attaching said protective member to said fender, and a frame-like member formed integrally with said protective member and extending along at least two of the sides of said opening, said frame-like member having openings therein adapted to cooperate with fastening members on said fender along said openings.

6. The combination with an automobile fender having an opening for admitting fuel, of an elongated protective member having a frame member arranged to align with said opening in said fender, and having one or more inturned elements arranged to co-act with corresponding elements formed on said fender along said opening, said first named elements being slotted to accommodate fastening means, means in said slots adapted to cooperate with openings in the elements formed on said fender for attaching said protective member to said fender, and a cover member for said fender opening hinged to said frame member.

7. The combination with an automobile fender having an opening for admitting fuel, of an elongated protective member having a portion arranged to align with said opening in said fender, and having one or more inturned elements arranged to co-act with corresponding elements formed on said fender along said opening, said first named elements being slotted to accommodate fastening means, means in said slots adapted to cooperate with openings in the elements formed on said fender for attaching said protective member to said fender, and a frame-like member formed integrally with said protective member and extending along all of the sides of the opening for framing the same, said frame-like member having openings therein adapted to cooperate with fastening members on said fender along said openings.

PERRY E. ALLEN.

REFERENCES CITED

The following references are of record in the file of this patent:

UNITED STATES PATENTS

| Number | Name | Date |
| --- | --- | --- |
| 581,977 | Clingman | May 4, 1897 |
| 1,480,274 | La Barre | Jan. 8, 1924 |
| 2,282,443 | Wilson | May 12, 1942 |
| 2,368,200 | Cavanagh | Jan. 30, 1945 |
| 2,417,324 | Rivard et al. | Mar. 11, 1947 |
| 2,467,001 | Allen | Apr. 12, 1949 |